United States Patent [19]

Toupin et al.

[11] Patent Number: 4,993,843
[45] Date of Patent: Feb. 19, 1991

[54] METHOD AND DEVICE FOR DETECTING THE TEMPERATURE TO WHICH A SOLID, A LIQUID OR A GAS MAY HAVE BEEN SUBJECTED

[75] Inventors: Joseph Toupin, Sable sur Sarthe; Xavier Douesnel, 10-16, rue Pierre Guérin, 75016 Paris, both of France

[73] Assignee: Xavier Douesnel, France

[21] Appl. No.: 162,314

[22] PCT Filed: May 19, 1987

[86] PCT No.: PCT/FR87/00162
§ 371 Date: Mar. 21, 1988
§ 102(e) Date: Mar. 21, 1988

[87] PCT Pub. No.: WO87/07373
PCT Pub. Date: Dec. 3, 1987

[30] Foreign Application Priority Data

May 20, 1986 [FR] France .................. 86 07590

[51] Int. Cl.$^5$ .................................. G01K 11/06
[52] U.S. Cl. ..................... 374/160; 116/204; 116/217; 335/215
[58] Field of Search ............ 374/24, 111, 160; 116/217, 204, 308; 335/215

[56] References Cited

U.S. PATENT DOCUMENTS

| 3,209,181 | 9/1965 | Brockman et al. | 335/215 X |
| 3,675,501 | 7/1972 | De Kanter | 116/217 X |
| 3,965,741 | 6/1976 | Wachtell et al. | 374/160 |
| 3,965,848 | 6/1976 | Shotkin . | |
| 4,143,617 | 3/1979 | Youngren . | |
| 4,187,799 | 2/1980 | Zwarun | 116/217 |
| 4,644,310 | 2/1987 | Anderson, III et al. | 335/215 |

FOREIGN PATENT DOCUMENTS 3229020 9/1984 Fed. Rep. of Germany .
2100043 3/1972 France .
2128441 10/1972 France .

OTHER PUBLICATIONS

"PCT International Publication" document No. WO 87/07373 filed May 19, 1987, J. F. Toupin, published 12/3/87, Method and Device for Detecting the Temperature to which a Solid, a Liquid or a Gas May Have Been Subjected.

Primary Examiner—Daniel M. Yasich
Attorney, Agent, or Firm—Willian Brinks Olds Hofer Gilson & Lione

[57] ABSTRACT

The device comprises a transparent tube (1) wherein may slide freely a part (4) at the extremities of which are arranged two small magnetic masses (5,6). The tube (1), closed at both ends, forms a sealed tank wherein there is placed a phase changing material (7) which is either in a liquid state or in a solid state, according to the temperature to which it has been brought. At one of the ends of the tube (1) a cap (12) containing a removable magnet (9a) is fitted. A fixed magnet (11) is placed at the other end of the tube (1). The part (4) being initially placed on the side of the cap (12), the material (7) is solidified and the removable magnet (9a) is then removed. In the case of exceeding the melting temperature of the material (7), the part (4) attracted by the magnet (11) moves towards the corresponding end of the tube (1), thus making visible a colored ring (14).

11 Claims, 1 Drawing Sheet

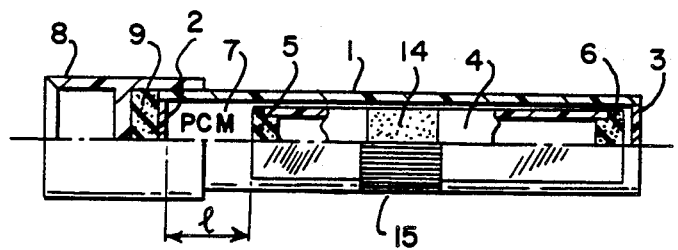
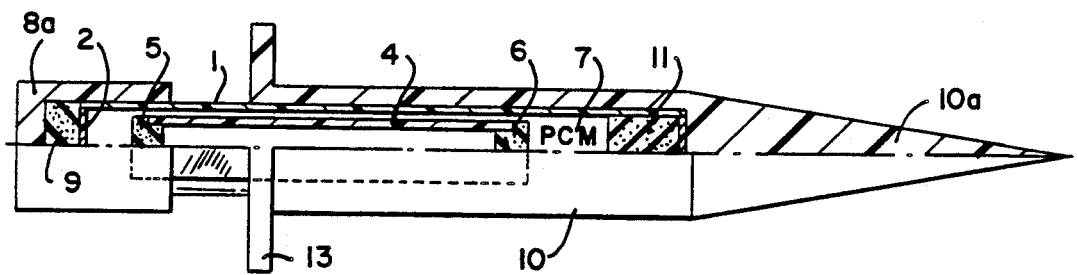
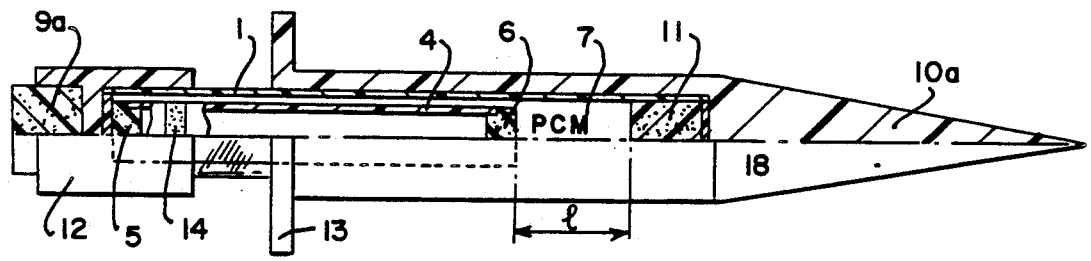
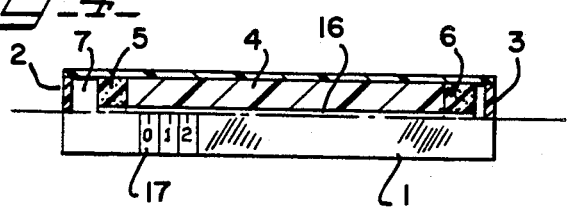

METHOD AND DEVICE FOR DETECTING THE TEMPERATURE TO WHICH A SOLID, A LIQUID OR A GAS MAY HAVE BEEN SUBJECTED

BACKGROUND OF THE INVENTION

Means exist for detecting the thermal level to which materials have been subjected. Detectors are known whose functioning is based for example on the variation in fluidity of a coloured matter, of which the progression by capillarity in a support gives a visual indication of exceeding a given temperature. Detectors using a different principle are also known, where an enzymatic reaction is translated by the variation in coloration of a surface of which the extent also indicates exceeding a thermal threshold. Such detectors are generally placed in the immediate proximity of the material to be monitored or thereon.

Such detectors present drawbacks: they are expensive, which does not allow use thereof for verifying the freshness of a food product, for example presented in the form of individual portions. Furthermore, these detectors, applied on a product, always indicate the exceeding of a superficial temperature or one in the proximity. In addition, they are of a certain fragility and cannot without drawbacks be immersed in a liquid or be subjected to compressions or inevitable shocks in the handling and transport operations. Furthermore, their structure does not allow them to be driven into the material or product to be monitored.

The evolution of eating habits of populations living in so-called developed countries is more and more oriented towards prepared dishes, cooked in vacuo for example. The life duration of such foodstuffs is a function of several parameters of which the most important appears to be the temperature which, when it lies below a determined maximum value, limits proliferation of bacteria. The same applies to the preservation, with maintenance of innocuosness, of certain drugs, including vaccines and sera. The examples of application set forth hereinabove are not limiting.

SUMMARY OF THE INVENTION

An object of the present invention is to provide a method and apparatus for detecting a rise in temperature to which a material (solid, liquid or gaseous) has been subjected, wherein there is applied to a piece mobile in an at least partially transparent tube a force of displacement towards a final position which tends to cause the mobile piece to leave an initial position where it is immobilized by a meltable substance placed inside the tube, which, on melting when the temperature rises sufficiently, releases the mobile piece.

In order to overcome these problems, the invention has a further object to improve the process of the type described above, so that it makes it possible to produce devices for detecting a rise in temperature which, although simple and inexpensive, are efficient and offer considerable reliability.

According to the process and above-described object of the invention, the force of displacement applied to the mobile piece is of purely magnetic origin and is produced by the interaction of magnetic elements comprising at least one permanent magnet and mounted respectively on the tube and on the mobile piece.

According to another feature of this process, the mobile piece is previously brought into initial position by application to this piece of an arming force likewise of purely magnetic origin, the meltable material having been temporarily liquefied to allow this prior operation.

In general, each of the forces of displacement and of arming employed is either a force of magnetic attraction or a force of magnetic repulsion.

The method according to the invention is based on the combination of two simple physical phenomena:

The first phemomenon is, the existence of materials meltable at diverse temperatures which, in the solid state, may prohibit the displacement of a mobile piece located therewithin and subjected to a force, this displacement becoming possible when the material takes the liquid state, the change of phase being effected at the melting temperature which is a characteristic constant of the material used;

The second phenomenon relates to the properties of the magnetic elements, thanks to which it is possible to apply forces without physical contact, through the solid, liquid or gaseous matters, these forces, which forces have an origin in magnetic fields issuing from permanent magnets, being forces of attraction or of repulsion which may be used separately or in additive or subtractive combination. The exclusive use of magnetic forces makes it possible to do without any elastic elements such as springs, whose mechanical properties change as a function of the temperature, with the result that the process offers perfect efficiency and excellent precision both at very high and very low temperatures.

The present invention also has for an object a device for detecting rise of the temperature of an object, based on the method defined hereinabove and comprising an oblong piece, mobile in an at least partially transparent tube, this piece being subjected to a force which tends to cause it to pass from an initial position, where it is immobilized by a meltable material placed inside the tube, to a final position, the mobile piece moving towards this latter position when it is released by the melting of said material.

According to the invention, the mobile piece comprises, at at least one of its ends, a magnetic element able to interact with a removable magnetic element which may be mounted at at least one end of the tube or be removed therefrom, so as to cause to appear, by positioning, withdrawal or permutation thereof, successively, the arming force in initial position and the force of displacement towards the final position, whilst means are provided for locating the position where the mobile piece is located.

Such a detector device employs jointly the change of state of a meltable matter contained in a tubular reservoir, in which is placed a mobile piece subjected to one or more forces of magnetic origin (attraction and/or repulsion). The positioning or withdrawal of the removable magnetic elements makes it possible to cause a magnetic force to appear or disappear, whilst its permutation makes it possible, when this element is a magnet or anisotropic magnetic element, to reverse the direction of an existing magnetic force.

Various embodiments of such a device can be envisaged.

The magnetic element of the mobile piece may be a permanent magnet, the removable magnetic element likewise being a permanent magnet which, depending on the orientation given thereto, exerts a force of attraction or a force of repulsion on the magnetic element of the mobile piece.

The mobile piece may comprise a magnetic element at each of its ends, on which may be exerted, by the removable magnetic element, a force in one direction or in the opposite direction depending on whether this latter magnetic element is placed at one or at the other of the ends of the tube.

At one end of the tube may be placed a fixed magnetic element, whilst the mobile piece comprises a magnetic element at each of its ends, the one which faces the fixed magnetic element being respectively either repelled or attracted by the latter, and a removable magnetic element is provided which may be placed at the other end of the tube, in that case exerting on the magnetic element of the mobile piece which faces it, a force respectively either of repulsion greater than the preceding force of repulsion, or of attraction.

In general, the magnetic elements between which appears a force of attraction are constituted either by two permanent magnets offering, opposite, poles of opposite signs, or by a permanent magnet and a soft iron mass.

Furthermore, when the mobile piece comprises a magnetic element at each of its ends, these two elements may advantageously be joined to form one, constituted, depending on the case, by a bar of soft iron or an oblong permanent magnet.

For certain particular applications, the tube should be provided with a terminal point making it possible to prick and partially insert the device into the object or the matter of which a rise in temperature must be detected, so as to allow monitoring of the temperature at the heart of the object or the product into which the device is inserted.

BRIEF DESCRIPTION OF THE DRAWINGS

Other characteristics and advantages of the invention will appear more clearly from the following description, with reference to the accompanying drawings, of non-limiting embodiments.

FIG. 1 shows, in longitudinal half-section, a detector device according to the invention which is armed either by turning a magnetic cap or by positioning the latter at the other end of the device.

FIGS. 2 and 3 similarly show two variant embodiments of a detector device according to the invention, provided with a penetration point, which is armed by withdrawal of a magnetic element.

FIG. 4 similarly shows a part of a detector device arranged to indicate the duration of exceeding of a given temperature.

DETAILED DESCRIPTION OF THE PREFERRED EMBODIMENTS

The different detectors shown employ the change of state of a matter contained in a reservoir in which is placed a mobile piece subjected to a force of attraction or of repulsion of magnetic origin.

The detector of FIG. 1 is composed of a transparent tube 1 obturated at its two ends by pieces 2 and 3. Inside tube 1 may freely slide, over a certain length l, a piece 4 constituted by a tube, at each of the ends of which has been fitted and immobilized an anisotropic magnetic mass (or magnet) 5, 6. The mobile piece 4 presents a coloured ring 14 or several rings coloured alternately with a different colour, this coloration advantageously being fluorescent or luminescent.

The tube 1 forms a tight reservoir in which has been introduced, before obturation of one of the ends, a phase change material (PCM) 7, which fills it completely and which is selected so that its physical characteristics of modification of structure, and in particular the temperature at which from the solid state it becomes liquid again, are perfectly known and immovable. This material may either be synthetic or of animal or vegetable origin; it may also be metallic. It is necessary and it suffices that its temperature of solidification or of liquefaction be invariable, liquefaction being equally well pure, as in the case of water, or an intermediate, so-called "pasty" phase may be admitted, as in the case of fats for example.

The prototypes made used, as material 7, hexadecene, which is an organic paraffin of which the temperature of change of phase is 2° C. The different components of said prototypes were made of polycarbonate thermoplastics material for the tubes, the magnetic masses were elastomers mixed with oriented ferrite powders. Obturation of the transparent tube 1 forming reservoir was ensured by simple adhesion of pieces 2 and 3.

Each end of tube 1 may be capped with a removable cap 8 containing a magnet 9. The polarities of the magnets 5 and 9 with respect to each other are chosen so that, during solidification of the phase change material 7, the inner piece 4 is repelled by the action of the magnetic field issuing from the magnet 9 of the cap 8 on the magnet 5, the polarity of the two opposite magnetic masses being of the same sign. To put the system into operation, it is necessary and it suffices, the phase change material 7 being in the solid state, to turn through 180° the cap 8 whose magnet 9, in that case presenting a reverse polarity, attracts the inner piece 4 by its magnet 5. It should be noted that such operation will be ensured and will produce the same effects if the cap 8 is placed at the other end of the tube 1, the direction of fit of the cap being chosen so that the magnetic mass of the magnet 9 that it contains is of the same polarity as the magnetic mass of the magnet 5 opposite it and located at the end of the piece 4.

Under these conditions, the detector being placed either in the environment or on the product to be monitored, the translation of the piece 4 will be produced as soon as the material 7 passes from the solid state to the liquid state, such displacement being materialized by the displacement of the coloured ring 14 of the inner piece 4 with respect to an opaque ring 15 which the outer tube 1 comprises and which initially concealed the ring 14.

The variant shown in FIG. 2 demonstrates the exceeding of a temperature within a product or a material by penetration of the detector therein. The present device, of which operation employs phenomena similar to those which were explained with regard to the device of FIG. 1, comprises: a piece 10 comprising on the one hand a point 10a for penetration and, on the other hand, a flange 13 limiting penetration of the detector. The piece 10 hermetically obturates one end of the transparent tube 1. Inside this tube and at this same end has been fitted and immobilized a magnet 11 presenting a magnetic mass of the same polarity as the magnetic mass of the magnet 6 opposite it. At the other end of the tube 1 is placed a magnet 9 mounted in a removable cap 8a and presenting a magnetic mass of the same polarity as the magnetic mass of the magnet 5 opposite it and located on piece 4. The various magnetic elements are provided so that the intensity of the magnetic flux of the magnet 9 is clearly greater than the intensity of the flux created by magnet 11. Consequently, the resultant of the two corresponding opposite forces causes the repulsion of the inner tube 4 towards the penetration point 10a. This initial position of the piece 4 being selected for the phase of solidification of the material 7, the removal of the cap 8a will put the system into operation by creating the application to the piece 4 of a force of opposite direction resulting from the sole repellant action of the fixed magnet 11 on the magnet 6 of said piece. When the temperature increases to such a point that the phase change material 7 passes into the liquid state again, such liquefaction causes the displacement of the piece 4 subjected to said force, demonstrated by a coloured sector 14 of the piece 4 which then presents itself in front of the transparent end of the tube 1 opposite the point 10a of piece 10.

FIG. 3 illustrates an embodiment which employs only magnetic forces of attraction. The general structure of this detector is similar to that of the detector shown in FIG. 2. A penetration piece 10 terminating in a point 10a hermetically obturates one of the ends of a transparent tube 1 and covers more than half of the length of this tube. The other end of the latter is obturated by a fixed cap 12 which caps it over a short length d and presents on its terminal face a cavity in which may be inserted, with slight tightening, a magnet 9a in the form of a pellet. At the opposite end of the tube 1 is placed a fixed magnet 11. This tube contains a tubular inner piece 4 which may move longitudinally therein over a length l, within a substance 7 capable of passing from the solid state to the liquid state or vice versa at a determined temperature. The mobile piece 4 comprises at its ends magnets 5, 6. The direction of magnetization of the four magnets 9a, 5, 6, 11, merges with the general axis 18 of the detector. Moreover, the opposite poles of the adjacent magnets 6, 11 are of opposite signs. The piece 4 comprises a coloured ring 14 which is concealed by the cap 8a made of opaque matter, when the mobile piece 4 is in its initial position in the tube 1 (which is that shown in FIG. 3), whilst this ring becomes visible through that portion of the transparent tube 1 included between the cap 8a and the flange 13 of the piece 10 when the piece 4 takes its final position after having moved from its initial position towards the point 10a of the piece 10.

Previously, the piece 4 is placed in its initial position, where it is retained by the magnet 9a inserted in the outer cavity of the cap 8a in a direction such that the opposite poles of the magnets 9a and 5 are of opposite signs, with the result that magnet 9a attracts to it piece 4.

To use the device, it suffices to withdraw the magnet 9a after the substance 7 has solidified due to a sufficient drop in temperature. The piece 4, consequently subjected to the sole attraction of magnet 11 on its magnet 6, takes its final position as soon as the temperature rises so as to cause the substance 7 to reliquefy. This displacement of piece 4 is manifested by the appearance of its coloured ring 14, which ceases to be concealed by the cap 8a and becomes visible through the wall of the tube 1.

It will be noted that, once the tube 4 has thus taken its final position, where its magnet 6 adheres to magnet 11 of tube 1, it is no longer possible (unless extraordinary means are employed) to cause the piece 4 to return into its initial position. In this way, detection of the rise in temperature is effected thanks to an irreversible phenomenon.

Several variants of the device of FIG. 3 may be envisaged:

Each of the couples 9a, 5 and 6, 11 of magnetic elements may be constituted, not by two magnets, but by a magnet and a small mass of soft iron, the mode of operation of the device remaining unchanged;

The two magnetic elements of the piece 4 may be joined to form one sole element, viz., depending on the case, a single magnet of oblong form or a piece of rod of soft iron.

A detector according to the invention may be arranged to indicate in visible manner the time during which it was subjected to a temperature greater than the point of liquefaction of the meltable material. To this end (FIG. 4), the mobile piece 4 is perfectly adjusted inside the tube 1 and forms therewith a piston-cylinder assembly. The magnetic forces of displacement of the mobile piece 4, acting on the magnet 5 and/or the magnet 6 with which said piece is provided at its ends, cause it to move (towards the left in FIG. 4), the material 7 in the liquid state transferring from the left end towards the right end of said piece via a calibrated capillary channel 16 pierced axially therein. In this case, the mobile piece 4 is made of a solid transparent bar. The calibrated channel 16 allows passage only of a well-defined volume, per unit of time, of the material 7 for a viscosity of determined value thereof, with the result that the length of filling of the channel 16 by the material 7, for which care has been taken to colour it, indicates, opposite a graduation scale 17 borne by the transparent tube 1, the time during which the temperature at which the detector was exposed exceeded the point of liquefaction of the material 7.

We claim:

1. A device for detecting a rise in the temperature of an object or material comprising:
   a tube that is at least partially transparent;
   a movable piece mounted for movement within the tube;
   means for indicating the position of the movable piece with respect to the tube;
   a meltable material disposed within the tube and comprising means for immobilizing the movable piece in an initial position; and
   magnetic means for selectively subjecting the movable piece to a first force urging the movable piece toward the initial position and a second force urging the movable piece toward a final position, the movable piece being so mounted that melting of the meltable material permits the movable piece to respond to the magnetic means and move toward the final position, the magnetic means comprising at least:
   a first magnetic element;
   removable mounting means for removably mounting the first magnetic element on at least a first end of the tube; and
   a second magnetic element disposed at a first end of the movable piece and being adapted to interact magnetically with the first magnetic element.

2. The apparatus of claim 1, the first and second magnetic elements comprising permanent magnets, wherein the removable mounting means comprises means for selectively mounting the first magnetic element to selectively exert a force of attraction and a force of repulsion on the second magnetic element.

3. The apparatus of claim 1, comprising a third magnetic element disposed at a second end of the movable piece, the first magnetic element comprising means for interacting with the second and third magnetic elements to selectively exert thereon a first force in one direction and a second force in an opposite direction when the first magnetic element is selectively placed at the first or a second end of the tube.

4. The apparatus of claim 1, comprising a third magnetic element disposed at a second end of the movable piece and a fourth magnetic element fixed at a second end of the tube in opposition to the third magnetic element, the third and fourth magnetic elements exhibiting mutual magnetic repulsion, and wherein, when the removable mounting means is in place on the first end of the tube, the first and second magnetic elements exhibit mutual magnetic repulsion that is greater than the mutual magnetic repulsion between the third and fourth magnetic elements.

5. The apparatus of claim 1, comprising a third magnetic element disposed at a second end of the movable piece and a fourth magnetic element fixed at a second end of the tube in opposition to the third magnetic element, the third and fourth magnetic elements exhibiting mutual magnetic attraction, the first and second magnetic elements exhibiting mutual magnetic attraction when the removable mounting means is in place on the first end of the tube.

6. The apparatus of one of claims 1-5, comprising at least two magnetically interacting permanent magnets having opposed poles of opposite sign.

7. The apparatus of one of claims 1-5, comprising at least two magnetically interacting magnetic elements in the form of a permanent magnet and a mass of soft iron.

8. The apparatus of one of claims 1-5, wherein the movable piece comprises a bar of soft iron forming magnetic elements at opposite ends of the movable piece.

9. The apparatus of one of claims 1-5, wherein the movable piece comprises an oblong permanent magnet forming magnetic elements at opposite ends of the movable piece.

10. The apparatus of one of claims 1-5, wherein the movable piece comprises a bar of transparent matter dimensioned to slide in the tube and having a longitudinal capillary channel formed therein, the capillary channel and the meltable material being so disposed that movement of the movable piece upon melting of the meltable material is accompanied by movement of the melted material in the capillary channel, the melted material having a color visible through the movable piece so as to exhibit a length therein that is a function of the duration of time during which the apparatus has been exposed to a temperature greater than the melting point of the meltable material.

11. The apparatus of one of claims 1-5, wherein at least a portion of the external surface of the apparatus tapers toward a point for facilitating the pricking of, and insertion of the apparatus into, an object or material of which a rise in temperature is to be detected.

* * * * *